UNITED STATES PATENT OFFICE.

JULES DUVAL, OF NEW ORLEANS, LOUISIANA.

IMPROVEMENT IN DEFECATING SACCHARINE LIQUIDS.

Specification forming part of Letters Patent No. 31,301, dated February 5, 1861.

*To all whom it may concern:*

Be it known that I, JULES DUVAL, of New Orleans, in the parish of Orleans and State of Louisiana, have invented a new and Improved Process for Defecating Saccharine Liquids; and I do hereby declare that the following is a full, clear, and exact description of the same.

This invention consists in the employment of liquid sulphurous acid, in combination with saccharate of lime and with a solution of pure sulphate of alumina, for the purpose of defecating and decolorizing saccharine liquids. The manner in which I employ the above-mentioned ingredients is as follows: As soon as the juice from the mill collects in a still of five hundred (500) or a thousand (1,000) gallons capacity, I add a quarter ($\frac{1}{4}$) or half ($\frac{1}{2}$) gallon, according to the capacity of the still, of liquid sulphurous acid of 4° Baumé. The quantity of the liquid sulphurous acid varies, however, according to the nature of the cane, its maturity, &c., and the operator has to use his judgment in regard to the quantity of acid required. After the acid has been added, the juice is left standing for about twenty minutes in the cold, and after this it is put into the defecating-pans. It is now heated to 120° Fahrenheit, and saccharate of lime previously prepared is now added until a voluminous precipitate and a clear transparent juice are obtained, which latter, however, is strongly colored by the excess of saccharate of lime. After having carried the heat up to 195° Fahrenheit, I let the liquid rest and pass it through a filter into another still, where the limpid but colored juice is left to cool. After the temperature has fallen to 70° or 80°, I effect the decomposition of the saccharate of lime kept in solution in the juice by the addition of a dose of pure sulphate of alumina of a density of 5° Baumé. Sulphate of lime and alumina in a gelatinous state is precipitated and the juice becomes clear and transparent in a few minutes. After the precipitation is finished, I draw off the clear juice; or, better, I pass it again through a filter, in order to separate the sulphate of lime and the alumina; and I now evaporate by any of the well-known means. The evaporation takes place rapidly, and there is now no danger of the formation of that glutinous scum which always threatens to run over with juice defecated in the ordinary manner.

The particular advantages of my process will be fully undestood from the following observations: It is well known that without an excess of lime a perfect defecation of saccharine liquids cannot be effected; but after having obtained the desired effect it is necessary to get rid of this excess of lime without altering the sugar, and several successive operations are usually employed for this purpose. Generally sugar-boilers are afraid to use a sufficient quantity of lime in order to avoid the coloring of the juice, and as a general thing the juice is left acid. Consequently a large quantity of matters kept in solution in the juice are not precipitated, and they cause a great loss by the conversion of the saccharine substances into glucose, which conversion is greatly facilitated by the acid left remaining in the juice. It has therefore been proposed to use bisulphite of lime for defecating saccharine liquids, and such would answer the purpose very well; but its manufacture is difficult, and the bisulphite of lime generally bought in the market is not sufficiently pure to enable the operator to fix upon the exact quantity of lime to be used. It has also been proposed to use sulphurous-acid gas, and the application of this gas was considered at first quite simple and easy; but it has been found that insurmountable difficulties are in the way of its coming into general use. The preparation of pure sulphurous-acid gas is very difficult, for by the combustion of sulphur in the open air a gas is obtained which actually does not contain more than from two to eight per cent. of sulphurous-acid gas, the remainder being nitrogen—a gas perfectly useless for the operation of defecating saccharine liquids. Besides this, it is impossible to determine the exact quantity of sulphurous-acid gas required for each operation; and if the quantity of the gas varies, as it really will, for each operation, it is also necessary to vary in the same proportion the doses of lime, which is impossible if the volume and the percentage of the gas are not known.

I prefer saccharate of lime to lime in powder, or to milk of lime, because by preparing the same always of a uniform density I am enabled to regulate the quantity required for each operation with perfect ease, and by knowing the exact quantity of lime in the solution I am enabled to find, by a simple calculation, the quantity of sulphate of alumina required for a perfect decomposition of the saccharate of lime. Powdered lime or milk of lime does not present the same advantages. A portion of this lime is precipitated in small particles to the bottom of the pan and dissolves quite slowly. In examining the defecation after having added the lime in the state of powder, or as milk of lime, the quantity appears to be correct; but after a few seconds an excess of lime will be found, which is occasioned by the slow dissolution of the precipitated particles of lime. The saccharate of lime, on the other hand, on account of its being soluble, acts instantaneously and uniformly on all parts of the juice.

By the employment of pure sulphate of alumina I gain a decided advantage—that of obtaining the acid required to form, with the lime, an insoluble salt, and at the same time a powerful agent for decoloration and clarification of the juice.

To resume: My process consists, first, in the employment of liquid sulphurous acid for the purpose of conserving saccharine liquids and to decolorize them at the same time; second, in the employment of saccharate of lime in excess for the purpose of defecating saccharine liquids—that is, to precipitate all those matters which are kept in solution and capable of being precipitated; third, in filtering, for the purpose of separating the precipitated matters from the liquid; fourth, in the employment of pure sulphate of alumina, for the purpose of decomposing the saccharate of lime and to convert it into insoluble sulphate of lime, and to make use of the decolorizing and clarifying qualities of the gelatinous alumina, which latter precipitates uniformly and simultaneously with the sulphate of lime; fifth, in filtering, for the purpose of separating the precipitate of lime and alumina from the clear liquid; sixth, in evaporating the defecated liquid in the usual manner.

The process is very simple and easily put in practice, and it can safely be intrusted to workmen having no scientific knowledge whatever, if the liquid sulphurous acid and the solutions of saccharate of lime and of sulphate of alumina are made of uniform and known density, and if the quantity of each of the above-named ingredients necessary for a certain kind of cane-juice or other saccharine liquid has once been determined.

I do not claim the employment of any one of the above-named substances singly and independently of the others; but What I do claim as new, and desire to secure by Letters Patent, is—

The process herein set forth, consisting in the successive application of the within-described substances to cane-juice or other saccharine liquids, substantially in the manner and for the purpose specified.

JULES DUVAL.

Witnesses:
O. CALING,
E. EUDE.